US008606651B2

United States Patent
Koike et al.

(10) Patent No.: US 8,606,651 B2
(45) Date of Patent: Dec. 10, 2013

(54) GENERATION OF HOME NETWORK USE RECOMMENDATIONS BASED ON COLLECTED METADATA OF PRIOR CONNECTED ITEMS

(75) Inventors: Motoyuki Koike, Kanagawa (JP); Scott Smyers, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 341 days.

(21) Appl. No.: 12/205,610

(22) Filed: Sep. 5, 2008

(65) Prior Publication Data

US 2010/0076997 A1    Mar. 25, 2010

(51) Int. Cl.
G06Q 30/00 (2012.01)
G06F 15/16 (2006.01)

(52) U.S. Cl.
USPC .................... 705/26.7; 705/26.5; 709/203

(58) Field of Classification Search
USPC .......... 705/10, 26.5, 26.7; 709/221, 230, 203; 707/3; 455/414.1
See application file for complete search history.

(56) References Cited

U.S. PATENT DOCUMENTS

| | | | | |
|---|---|---|---|---|
| 5,448,760 | A * | 9/1995 | Frederick | 455/410 |
| 5,675,748 | A * | 10/1997 | Ross | 710/104 |
| 6,182,085 | B1 * | 1/2001 | Eichstaedt et al. | 1/1 |
| 6,631,185 | B1 * | 10/2003 | Fleming, III | 379/121.02 |
| 6,947,922 | B1 * | 9/2005 | Glance | 705/26.1 |
| 7,949,675 | B2 * | 5/2011 | Evans et al. | 707/770 |
| 2001/0001318 | A1 * | 5/2001 | Kamiya et al. | 700/246 |
| 2003/0046282 | A1 * | 3/2003 | Carlson et al. | 707/6 |
| 2003/0200132 | A1 * | 10/2003 | Bryant | 705/10 |
| 2004/0243693 | A1 * | 12/2004 | Beisiegel et al. | 709/220 |
| 2005/0008327 | A1 * | 1/2005 | Shinkai | 386/52 |
| 2005/0182792 | A1 * | 8/2005 | Israel et al. | 707/104.1 |
| 2005/0198233 | A1 * | 9/2005 | Manchester et al. | 709/221 |
| 2006/0074810 | A1 * | 4/2006 | Verberkt et al. | 705/57 |
| 2006/0099944 | A1 * | 5/2006 | Ross et al. | 455/432.3 |
| 2006/0136589 | A1 * | 6/2006 | Konig et al. | 709/224 |
| 2006/0173838 | A1 * | 8/2006 | Garg et al. | 707/5 |
| 2006/0200432 | A1 * | 9/2006 | Flinn et al. | 706/12 |
| 2007/0073870 | A1 * | 3/2007 | Park et al. | 709/224 |
| 2007/0094266 | A1 * | 4/2007 | Parikh et al. | 707/10 |
| 2007/0094583 | A1 * | 4/2007 | Randall et al. | 715/500.1 |
| 2007/0157267 | A1 * | 7/2007 | Lopez-Estrada | 725/90 |
| 2007/0162753 | A1 * | 7/2007 | Nakano et al. | 713/171 |
| 2007/0208718 | A1 * | 9/2007 | Javid et al. | 707/3 |
| 2007/0233782 | A1 * | 10/2007 | Tali | 709/203 |
| 2007/0288309 | A1 * | 12/2007 | Haberman et al. | 705/14 |
| 2007/0299741 | A1 * | 12/2007 | Emerick et al. | 705/26 |
| 2008/0040495 | A1 * | 2/2008 | Adams et al. | 709/230 |
| 2008/0060070 | A1 * | 3/2008 | Uno | 726/21 |

(Continued)

FOREIGN PATENT DOCUMENTS

JP    2007226890 A  *  9/2007

Primary Examiner — Firmin Backer
Assistant Examiner — Michael A Chambers
(74) Attorney, Agent, or Firm — Sony Corporation (57) ABSTRACT

Particular embodiments provide home network use recommendations to a user. The home network use recommendations may involve recommendations on items, which may include devices, applications, and/or services. When users connect an item (e.g., a device) to a home network, information associated with the item may be received. Metadata for the information is generated that describes the information. The metadata may be stored in storage in a user profile for the user. The user profile may then be analyzed to determine home network use recommendations. For example, recommendations may be how to use or configure the home network.

25 Claims, 5 Drawing Sheets

(56) References Cited

U.S. PATENT DOCUMENTS

| | | | |
|---|---|---|---|
| 2008/0086456 A1* | 4/2008 | Rasanen et al. | 707/3 |
| 2008/0106911 A1* | 5/2008 | Park et al. | 362/612 |
| 2008/0134043 A1* | 6/2008 | Georgis et al. | 715/733 |
| 2008/0249967 A1* | 10/2008 | Flinn et al. | 706/11 |
| 2008/0306808 A1* | 12/2008 | Adjali et al. | 705/10 |
| 2009/0132698 A1* | 5/2009 | Barnhill, Jr. | 709/224 |
| 2009/0163183 A1* | 6/2009 | O'Donoghue et al. | 455/414.1 |
| 2009/0172021 A1* | 7/2009 | Kane et al. | 707/104.1 |
| 2009/0204692 A1* | 8/2009 | Smith et al. | 709/221 |
| 2009/0298480 A1* | 12/2009 | Khambete et al. | 455/414.1 |

* cited by examiner

GENERATION OF HOME NETWORK USE RECOMMENDATIONS BASED ON COLLECTED METADATA OF PRIOR CONNECTED ITEMS

BACKGROUND

Particular embodiments generally relate to computing and more specifically to consumer electronics. As devices become networked and can interact with other devices, applications, and/or services, the setup and configuration of these devices may become more complicated. For example, determining how to connect devices from different manufacturers together may be difficult.

Also, devices increasingly have had more features added to them. Often, a lot of these features are not taken advantage of by a user. For example, the user may not know the feature exists. Also, the feature, in order to work, may require interaction with other devices that a user does not own, or are not otherwise connected. Accordingly, a user may not be using their devices in the most optimal manner.

SUMMARY

Particular embodiments provide home network use recommendations to a user. The home network use recommendations may involve recommendations on items, which may include devices, applications, and/or services. When users connect an item (e.g., a device) to a home network, information associated with the item may be received. Metadata for the information is generated that describes the information. For example, the items may be devices, applications, or services used and metadata describes the use of the items, configuration of the item, etc. In one example, the capabilities and configurations of devices connected to the home network are stored. The metadata may be stored in storage in a user profile for the user. Thus, as the user connects items to the home network, metadata for the items may be stored and may be persistent in the storage even as the user removes the items, stops using the items, or connects new ones. Thus, a history of which items the user has connected to the home network and also a current configuration of items connected to the home network are provided.

The user profile may then be analyzed to determine home network use recommendations. For example, recommendations may be how to use or configure the home network. Examples of recommendations may be different devices that can be connected to the home network, different ways of configuring items in the home network, different ways of using items in the home network, whether a previously used item should be reconnected to the home network or turned on, whether a new item should be added to the home network, how to add a new item to the home network, etc.

A further understanding of the nature and the advantages of particular embodiments disclosed herein may be realized by reference of the remaining portions of the specification and the attached drawings.

DETAILED DESCRIPTION OF EMBODIMENTS

Figure 1:
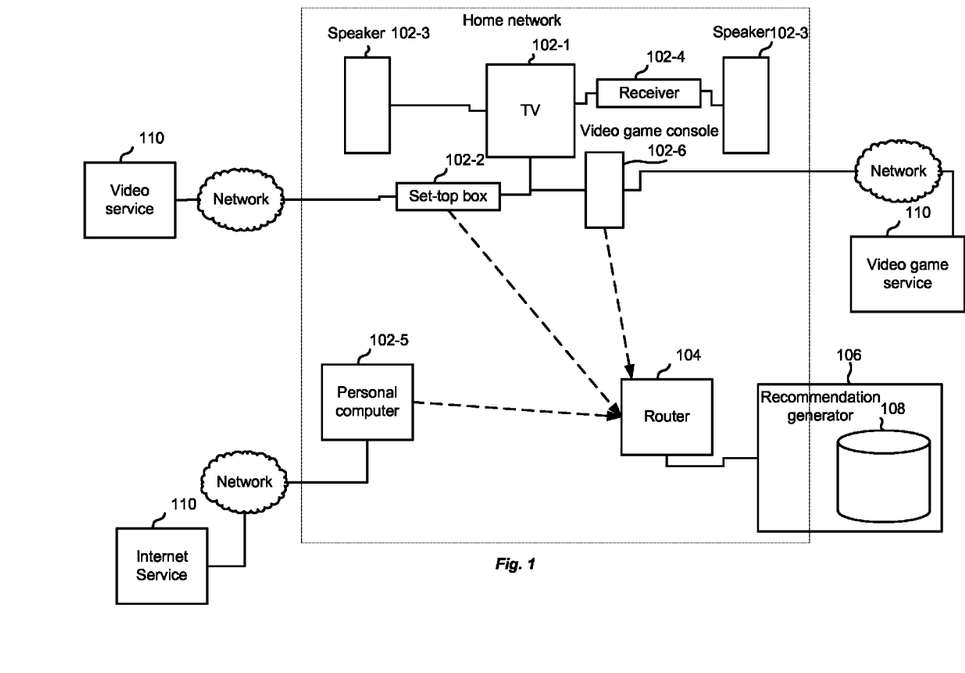
FIG. 1 depicts an example of a system for storing metadata according to one embodiment.

FIG. 1 depicts an example of a system 100 for storing metadata according to one embodiment. As shown, a home network is provided. In a home network, various items 102 may be interconnected. In one example, items 102 may be connected to a router 104. Also, items 102 may be interconnected amongst themselves.

Router 104 may be a wireless router, switch, wired router, or any other device capable of communicating with items 102. In one example, various items 102 may be wirelessly connected to router 104 and/or items 102 may be connected through a local area network (e.g., Ethernet) with router 104.

Items 102 may be devices, applications, and/or services. For example, an item may be a physical device, such as a television. Also, an item may be a software application, such as an application on a personal computer. Further, any services that are used by devices may be considered an item. Different items 102 are shown as being part of the home network. Although these items 102 are shown, it will be understood that items may not be physically connected to the home network. For example, a service 110 used by personal computer 102-5 may be considered an item.

As shown in FIG. 1, a home entertainment system is provided that includes item a television 102-1, which may receive video from a set top box 102-2. Set top box 102-2 may be connected to a video service 110 that provides programming to set top box 102-2. The video service may provide television programming, movies-on-demand, etc. The connection may be through satellite, wireless, or a wired connection.

Further, speakers 102-3 and a receiver 102-4 may be connected to the TV to provide audio. Also, receiver 102-4 may be connected to a personal computer 102-5 (connection not shown). In this case, music, such as digital audio files, may be sent to receiver 102-4 for output on speakers 102-3.

A video console 102-6 may also be connected to a video game service 110 that may provide online video game play. This may be provided through an Internet connection.

Personal computer 102-5 may be a laptop computer, desktop, or any other personal computing device. Personal computer 102-5 may be used to connect to Internet services 110, such as music download sites, video-on-demand, the Internet, etc.

Figure 2:
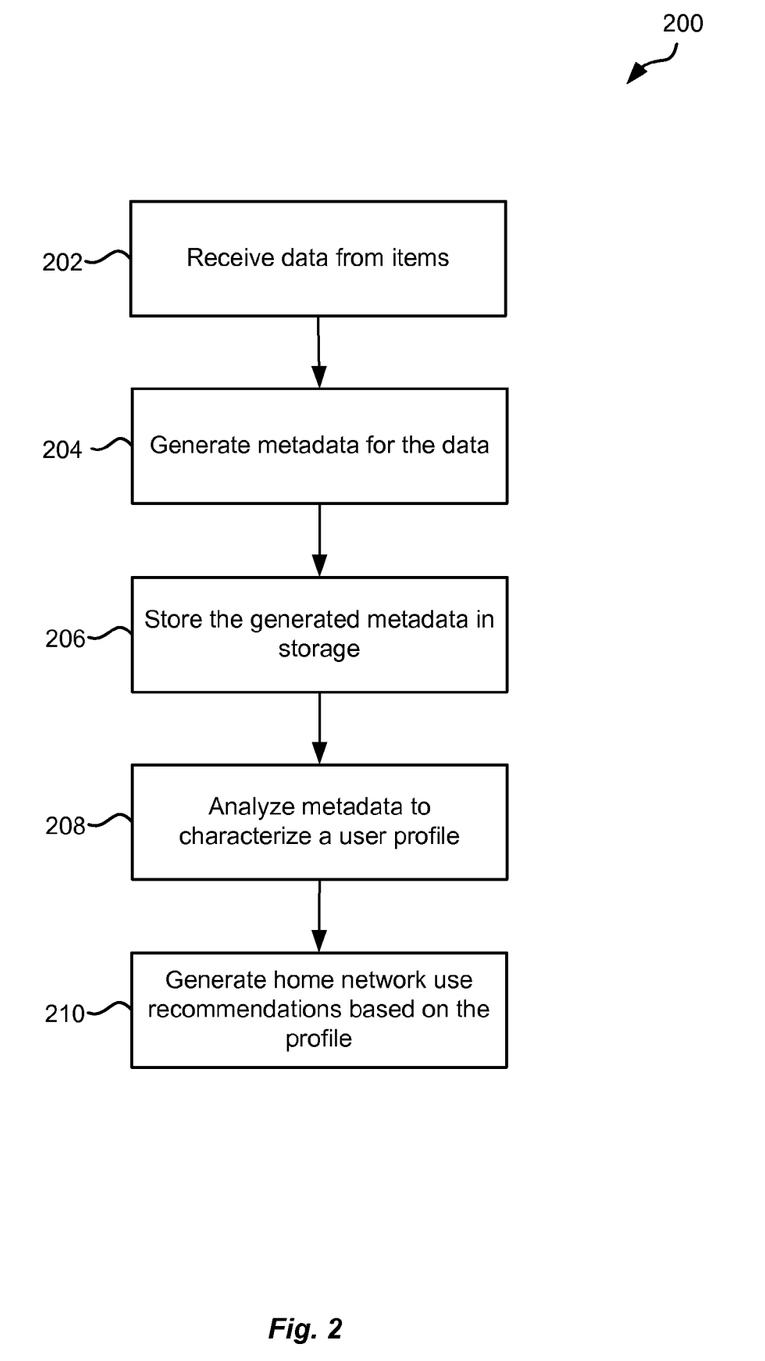
FIG. 2 depicts a simplified flowchart of a method for generating home network use recommendations according to one embodiment.

Items 102 shown in FIG. 2 may be connected to wireless router 104. In one example, every single item 102 may have a connection to wireless router 104. In other embodiments, all items 102 may not be directly connected to wireless router 104; however, items 102 may be connected to other devices that are connected to wireless router 104. For example, television 102-1 may not be wirelessly connected to wireless router 104, but through a wired connection to set top box 102-2, it may be connected to wireless router 104 through set-top box 102-2. In this case, the television may communicate information to wireless router 104 through set-top box 102-2. Alternatively, there may be multiple routers in the network to conveniently assure wired or wireless connectivity between and among all items.

Information about items 102 that are connected to the home network may be sent to recommendation generator 106. Items 102 can be connected to the home network just by being connected to router 104. Also, items 102 may be connected to the home network by interacting with items 102 that are connected to the home network. Thus, items 102 may not be directly connected to the home network.

Storage 108 may be stored in storage that is found in the home network. In other embodiments, it may be stored outside the home network, such as in a device in a wide area network (WAN), the Internet, at a third party, etc. In one example, storage 108 may be an external hard drive that is found in a user's home. In other embodiments, storage 108 may be found on a server that is part of a wide area network.

When information for items 102 is received, metadata may be determined. The metadata provides information about the items that are connected to the home network. For example, information may be which items 102 have been connected to the home network, which software is being used, which services are being used, which transactions have been performed with the service, etc. For example, the identifier for an item is received. Metadata describing features of the item may then be determined.

Recommendation generator 106 may be able to generate home network use recommendations based on the metadata stored in storage 108. For example, the home network use recommendations may be recommendations on devices to purchase, services to use, possible changes to configurations of the home network, etc.

The generation of home network use recommendations will now be described. FIG. 2 depicts a simplified flowchart 200 of a method for generating home network use recommendations according to one embodiment. Step 202 receives data for items 102. The data may be received from items 102 directly. Also, items 102 may be interacting with other items and send information for the items being interacted with. The data may include device identifiers, content identifiers, transaction information, usage logs, capability information for devices, etc. The information may also be received from items outside of the home network. For example, a service 110 may aggregate metadata for transactions performed with a device in the home network and send the metadata to storage 108.

Step 204 generates metadata for the data. Different items 102 may be made by different manufacturers and may be described in different ways, etc.; thus, a uniform system to store metadata may be provided to allow analysis. The class of device may be detected and the format of the data received may be determined. From that format, the metadata may be generated and stored in the uniform format. This allows an application to analyze a uniform set of metadata, which may be useful because different devices from different manufacturers may be connected to a home network and may describe information differently. For example, different devices may have different identifiers depending on their manufacturer. In another example, information obtainable directly from a device may be limited, but sufficient to allow a richer set of information to be obtained from an Internet service or elsewhere, such limited information and richer information can then be translated into the uniform format and then stored.

Step 206 stores the generated metadata in storage 108. In one embodiment, the metadata may be sent through a network, such as a wide area network, to storage 108. Also, the metadata may be stored in a home network.

Step 208 analyzes metadata to characterize a user profile. For example, a user profile may be provided that summarizes information for items 102 connected to the user's home network. The user profile may be associated with a single home network. Also, the profile may be associated with various users. For example, a first user may have a first profile for a home network and a second user may have a second profile for the home network. This may take into account different ways that users use the home network. The characterization may analyze what devices are typically used and in what configuration, such as "user A generally looks for movies on home server A", or "user B often accesses and manipulates photos on home server B", etc. There is no limit to the sophistication of the characterization. For example, a user profile may also include usage patterns based on time of day or day of week or day of the month. For example, "user A accesses personal financial information every Saturday morning by first downloading latest checking account information from online bank".

Step 210 generates home network use recommendations based on the characterization. In one example, the metadata may be mined by a third party computer to generate the home network use recommendations. A user may provide permission to the third party computer to access the metadata. Depending on the analysis, different uses of the home network may be determined. This may be recommending content, products, services, or adjustments to common usage patterns, etc. based on the metadata in the profile. Also, collaborative filtering may be performed to provide recommendations based on the profiles of other home networks, which will be described in more detail below.

Figure 3:
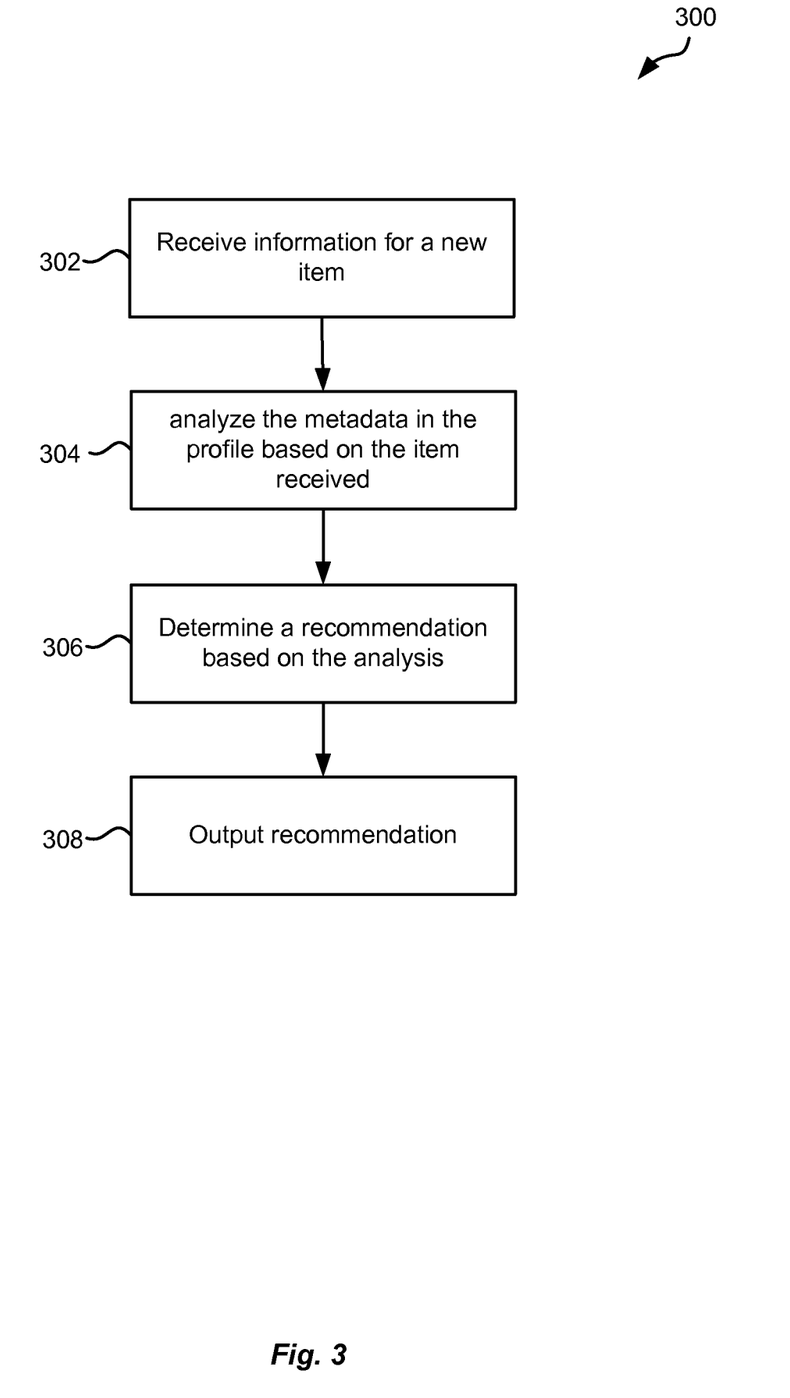
FIG. 3 depicts a simplified flowchart of a method for providing real time recommendations according to one embodiment.

The recommendations may be provided at any time, such as weekly, monthly, on demand or on detected error conditions, etc. Also, real time recommendations may be provided for new item (e.g., a new consumer electronic device). For example, when a user wants to purchase a new device, a recommendation may be provided based on the profile. FIG. 3 depicts a simplified flowchart 300 of a method for providing real time recommendations according to one embodiment. Step 302 receives information for a new item. For example, the user may be purchasing a new device, such as a digital virtual disc (DVD), at a point-of-sale (POS) device. The POS device may be used to scan a bar code or other identifier to send it to recommendation generator 106. Also, the user may use a portable device, such as a cellular phone or personal digital assistant (PDA) to scan a bar code to determine an identifier for the item.

At step 304, recommendation generator 106 may analyze the metadata in the profile based on the new item. For example, information for the new item may be translated into a uniform metadata format and may be run through an analysis engine to be compared to metadata in the profile. An identifier may be used to identify a class of item and its configuration/use.

In step 306, recommendation generator 106 determines a recommendation based on the analysis. For example, the recommendation may be that user should purchase another item instead of the item identified in step 302. For example, if the user is buying a Blu-ray format movie, and the user does not own a Blu-ray player, then the recommendation may be to buy a Blu-ray player, or a DVD format of the movie as two alternatives from which the user can then choose.

In step 308, the recommendation is output. For example, recommendation generator 106 may send the recommendation to the user, such as to a point-of-sale device, the user's cellular phone, or the user's e-mail address, etc.

Figure 4:
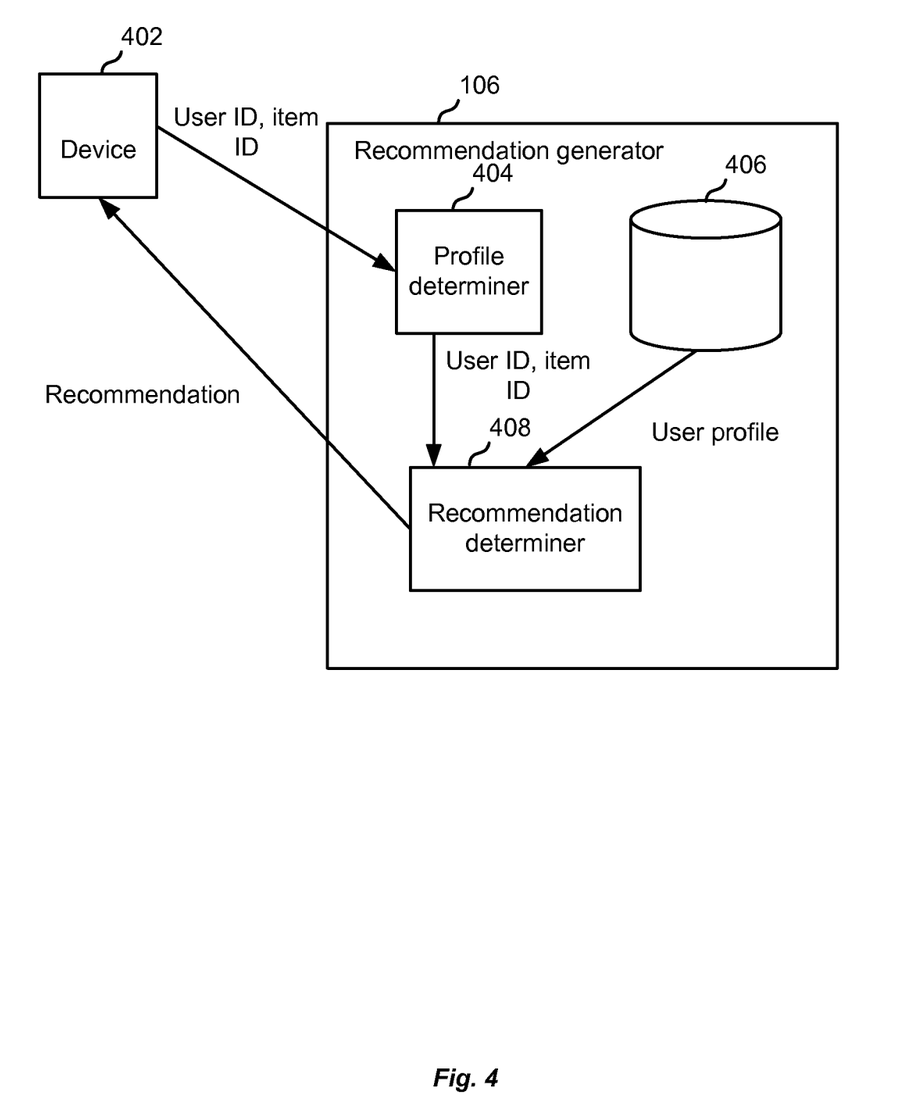
FIG. 4 depicts an example system for providing real time recommendations according to one embodiment.

FIG. 4 depicts an example system for providing real time recommendations according to one embodiment. A device 402 is configured to determine an identifier for the new item. For example, device 402 may be a cellular phone with a barcode scanner that can scan a barcode. Also, device 402 may also be a personal computer for the user where the user is performing searches on the Internet. As a search is being performed to purchase a new item, an identifier for the item may be sent to recommendation generator 106.

Recommendation generator 106 receives the identifier and a user ID. A profile determiner 404 then determines the profile associated with the home network. For example, the user ID is used to retrieve a user profile from storage 406. The user ID may be personalized to a user (when multiple user profiles are associated with a home network) or may be an ID that identifies just the home network. This user profile includes metadata for items that have been connected to the home network.

A recommendation determiner 408 determines a home network use recommendation. For example, metadata from the user profile is analyzed to determine a recommendation for the item ID. The recommendation could be how to configure the network using the item, other items that may be considered better or more suitable for the home network than the item, etc.

Figure 5:
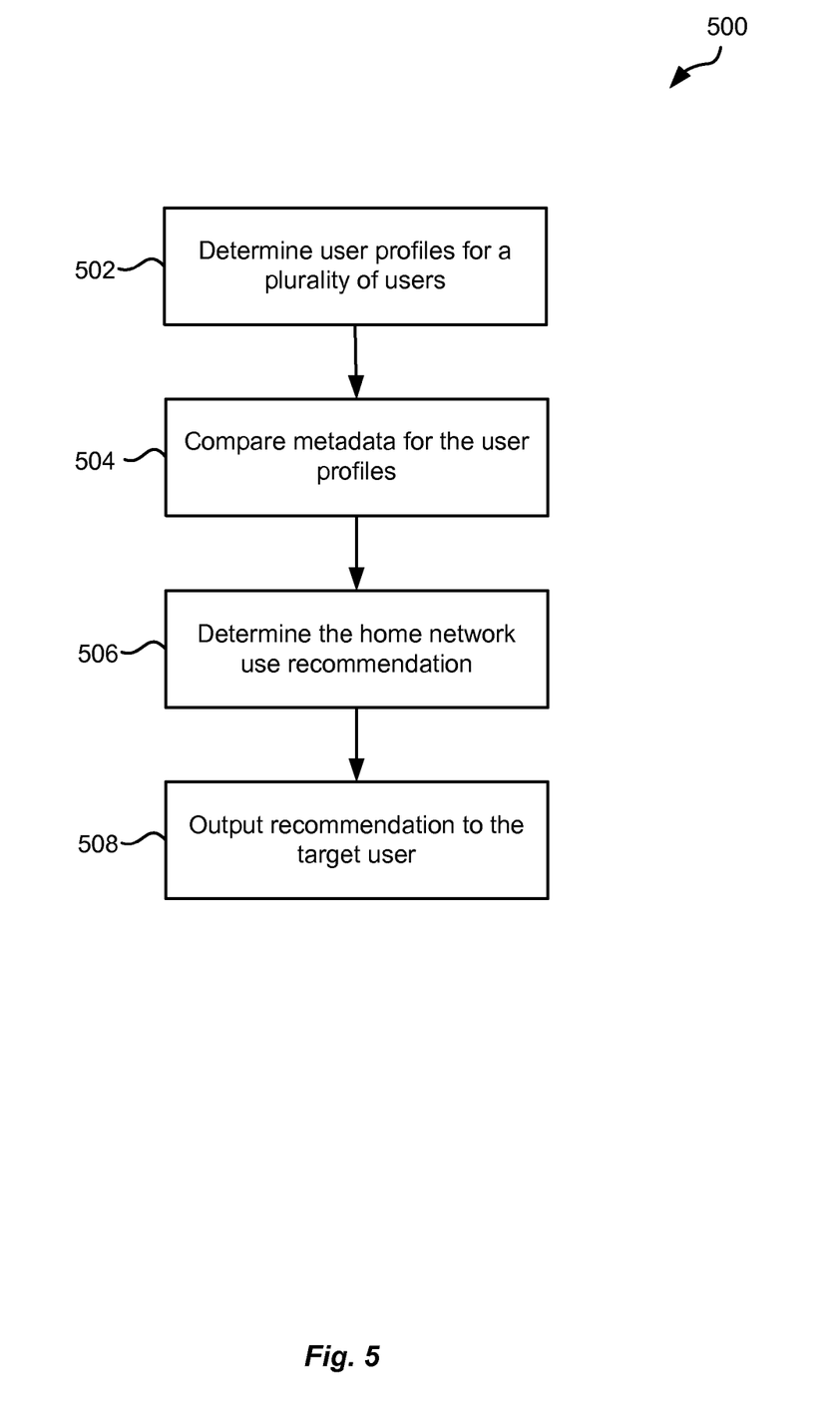
FIG. 5 depicts a simplified flowchart of a method for providing collaborative recommendations according to one embodiment.

As mentioned above, collaborative filtering may be provided to determine recommendations. Collaborative filtering involves using information associated with other users to determine recommendations for a target user. FIG. 5 depicts a simplified flowchart 500 of a method for providing collaborative recommendations according to one embodiment. In step 502, recommendation determiner 106 determines user profiles for a plurality of users. For example, profiles for a plurality of home networks may be determined. In one example, users may give permission to share the metadata in their profiles with other users.

In step 504, recommendation determiner 106 compares metadata for the user profiles. In one example, home networks that include certain configurations that are similar to a target home network may be determined. If similar home network configurations include an item that the target home network does not, then that item may be recommended. Also, different ways of configuring the home network may be determined that are different from the configuration of the target home network. In one example, if a first home network has the same receiver as the target home network but the first home network has surround-sound speakers, then it may be recommended that the user buy and install surround-sound speakers for the target home network. Alternatively, if a home network similar to the user's home network has a wired connection between a server device and a TV, but the user's home network has wireless, it may be recommended that the user change that connection from wireless to wired.

In step 506, recommendation determiner 105 determines the home network use recommendation. In step 508, the recommendation is output to the target user.

Accordingly, information of items previously connected to a home network may be used to generate recommendations. The information may be persistent in that these are items that have been connected to a user's home network previously. The information may continue to be stored even after the items may have been removed. This information will be usable for future recommendations. The recommendations given may be useful to help a user configure a home network, use a home network, or purchase products, items, or services.

Although the description has been described with respect to particular embodiments thereof, these particular embodiments are merely illustrative, and not restrictive. Although consumer electronics are described, it will be understood that any items used in a home may be considered.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for providing recommendations to a user, the method comprising:
   receiving information associated with a plurality of items connected to a home network, wherein the information associated with each item of the plurality of items comprises data identifying the item and data identifying usage pattern of the items by the user;
   generating metadata for the received information associated with each item of the plurality of items, wherein the metadata describes the usage pattern and configuration information for each of the plurality of items connected to the home network;

translating metadata associated with each item of the plurality of items into a uniform format;
storing the translated metadata in storage in association with a user profile; and
generating a recommendation based on an analysis of the stored metadata, wherein the recommendation comprises recommending different ways of configuring the home network using the plurality of items.

2. The method of claim 1, further comprising:
receiving an identifier for a new item being purchased by a user; and
analyzing the metadata associated with the user profile to determine a recommendation for the new item in real-time, wherein the recommendation for the new item is based on comparison of the metadata associated with the user profile with metadata of the new item, wherein the recommendation for the new item comprises recommending different ways of using the new item in the home network.

3. The method of claim 2, wherein the recommendation for the new item further comprises recommending a second item different from the new item in real-time, wherein the recommended second item is considered more compatible with the home network than the new item.

4. The method of claim 2, wherein the identifier is received through a network from a device outside of the home network.

5. The method of claim 1, further comprising recommending to change a configuration of the home network.

6. The method of claim 1, further comprising generating the recommendation for recommending different ways of configuring the home network using the plurality of items based on metadata for information associated with one or more devices currently absent from the home network, wherein the one or more currently absent devices were previously connected to the home network.

7. The method of claim 1, wherein the metadata is stored in a central database, wherein the central database is accessible by a recommendation generator to generate the recommendation.

8. The method of claim 1, further comprising:
receiving metadata for other users different from a user of the home network; and
generating the recommendation based on the metadata for the other users, wherein the recommendation is based on configurations of one or more items in other home networks associated with the other users.

9. The method of claim 1, wherein the plurality of items comprises items outside of the home network.

10. An apparatus comprising:
a processor; and
logic encoded in one or more tangible media for execution by the processor and when executed operable to:
receive information associated with a plurality of items connected to a home network, wherein the information associated with each item of the plurality of items comprises data identifying the items and data identifying usage pattern of the items by the user;
generate metadata for the received information associated with each item of the plurality of items, wherein the metadata describes the usage pattern and configuration information for each of the plurality of items connected to the home network;
translate metadata associated with each item of the plurality of items into a uniform format;
store the translated metadata in storage in association with a user profile; and
generate a recommendation based on an analysis of the stored metadata, wherein the recommendation comprises recommending different ways of configuring the home network using the plurality of items.

11. The apparatus of claim 10, wherein the logic when executed is further operable to:
receive an identifier for a new item being purchased by a user; and
analyze the metadata associated with the user profile to determine a recommendation for the new item in real-time, wherein the recommendation for the new item is based on comparison of the metadata associated with the user profile with metadata of the new item, wherein the recommendation for the new item comprises recommending different ways of using the new item in the home network.

12. The apparatus of claim 11, wherein the logic when executed is further operable to recommend, in real-time, a second item different from the new item, wherein the second item is considered more compatible with the home network than the new item.

13. The apparatus of claim 11, wherein the identifier is received through a network from a device outside of the home network.

14. The apparatus of claim 10, wherein the logic when executed is further operable to recommend to change a configuration of the home network.

15. The apparatus of claim 10, wherein the logic when executed is further operable to:
generate the recommendation for recommending different ways of configuring the home network using the plurality of items based on metadata for information associated with one or more devices currently absent from the home network, wherein the one or more currently absent devices were previously connected to the home network.

16. The apparatus of claim 10, wherein the metadata is stored in a central database, wherein the central database is accessible by a recommendation generator to generate the recommendation.

17. The apparatus of claim 10, wherein the logic when executed is further operable to:
receive metadata for other users different from a user of the home network; and
generate the recommendation based on the metadata for the other users, wherein the recommendation is based on configurations of one or more other items in other home networks associated with the other users.

18. The apparatus of claim 10, wherein the plurality of items comprises items outside of the home network.

19. A method for providing recommendations to a user, the method comprising:
receiving information associated with a plurality of items connected to a first home network, wherein the information associated with each item of the plurality of items comprises data identifying the item and data identifying one or more usage patterns of the item;
generating metadata for the received information associated with each item of the plurality of items, wherein the metadata describes the usage pattern and configuration information for each of the plurality of items connected to the first home network;
translating metadata associated with each item of the plurality of items into a uniform format;
storing the translated metadata in storage in association with a user profile;

generating a first recommendation for recommending different ways of configuring the first home network based on an analysis of the stored metadata; and transmitting the first generated recommendation to a second home network different from the first home network, wherein the second home network generates a second recommendation for recommending different ways of configuring the second home network based upon the first generated recommendation.

20. The method of claim 19, wherein generating the metadata further comprises describing user usage patterns and configuration information for devices previously connected to the first home network and currently absent from the first home network.

21. The method of claim 19, wherein the second home network recommends a new item for addition to the second home network based on the first generated recommendation.

22. The method of claim 19, wherein the second home network recommends how to use the second home network based on the first generated recommendation.

23. The method of claim 1, further comprising recommending different ways of using the plurality of items in the home network.

24. The method of claim 1, further comprising recommending how to use the plurality of items in the home network.

25. The method of claim 1, further comprising recommending how to add a new item in the home network.

\* \* \* \* \*